United States Patent [19]

Erickson

[11] 4,245,937
[45] Jan. 20, 1981

[54] CLAMPING MECHANISM FOR CUTTING INSERT

[75] Inventor: Robert A. Erickson, Ligonier, Pa.

[73] Assignee: Kennametal Inc., Latrobe, Pa.

[21] Appl. No.: 946,814

[22] Filed: Sep. 28, 1978

[51] Int. Cl.³ .......................... B26D 1/00; B25G 3/20
[52] U.S. Cl. ..................................... 407/105; 403/374
[58] Field of Search ........................ 407/103, 104, 105; 403/362, 351, 370, 374

[56] References Cited

U.S. PATENT DOCUMENTS

| 2,704,682 | 3/1955 | Davis | 403/374 |
|---|---|---|---|
| 2,996,158 | 8/1961 | Greenleaf | 403/370 |
| 3,188,717 | 6/1965 | Heinlein | 407/104 |
| 3,192,603 | 7/1965 | Greenleaf | 407/103 |
| 3,323,192 | 6/1967 | Gustafson | 407/103 |
| 3,339,256 | 9/1967 | Melinder | 407/103 |
| 3,357,080 | 12/1967 | Milewski | 407/105 |
| 3,419,293 | 12/1968 | Conrad | 403/351 |
| 3,854,183 | 12/1974 | Roos | 407/104 |
| 3,905,081 | 9/1975 | Winfelt | 407/103 |
| 3,946,473 | 3/1976 | Peterson | 407/105 |
| 3,965,553 | 6/1976 | Faber | 407/104 |

FOREIGN PATENT DOCUMENTS 450881  8/1949  Italy ........................................ 403/374

Primary Examiner—Harrison L. Hinson
Attorney, Agent, or Firm—Lawrence R. Burns

[57] ABSTRACT

A toolholder for holding a cutting insert having an axial hole is disclosed having a pocket therein for seating of the insert and a hole in the toolholder extending transversely through the bottom of the pocket. A pin having a head for engaging the insert and a pivotal shoe member cooperate in the hole such that, as the rotatable pin is tightened, the shoe member forces the head of the pin to tilt toward a side wall of the pocket and clamp the insert to the toolholder.

9 Claims, 5 Drawing Figures

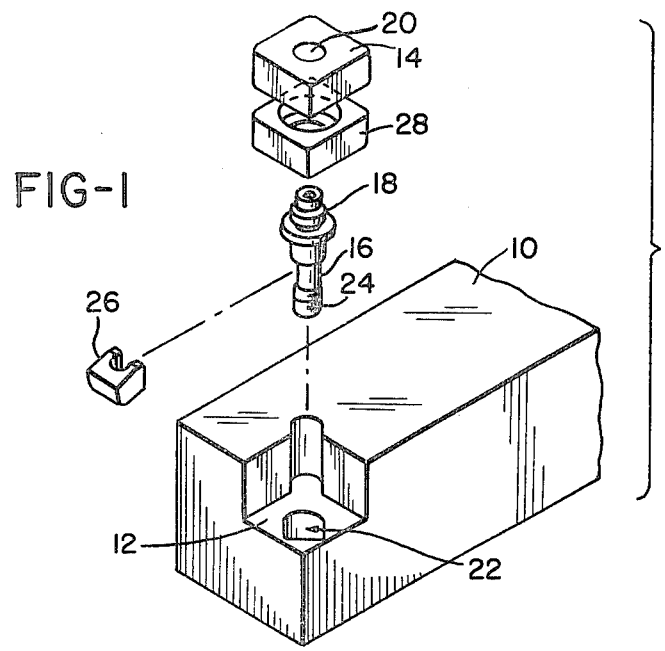
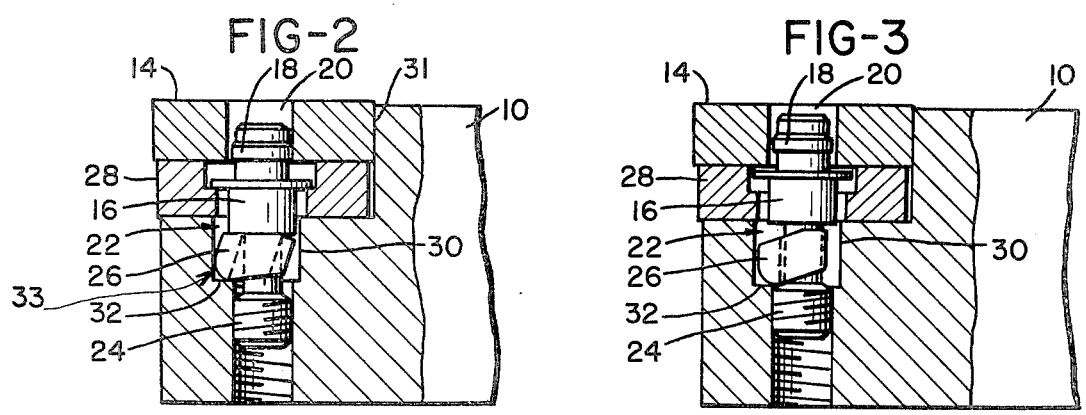
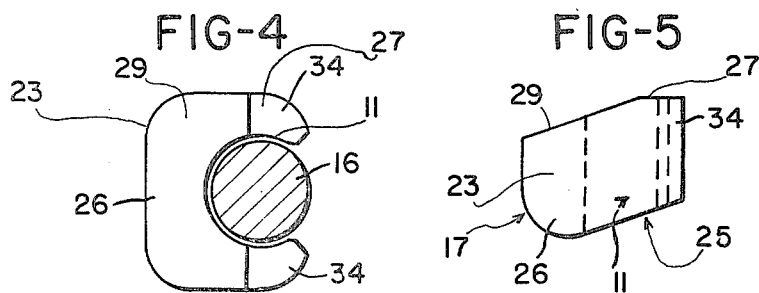

CLAMPING MECHANISM FOR CUTTING INSERT

BACKGROUND OF THE INVENTION

The present invention concerns clamping mechanisms for holding cutting inserts on toolholders during material removal operations.

A toolholder usually is comprised of a shank for attachment to a machine and a pocket on one end for seating of a cutting insert, usually an indexable cutting insert. The insert on the toolholder must always be firmly and positively located in order to provide as consistent a cut in the work material as possible.

In some cases, the clamping mechanism can take the form of an external clamp that is located on top of the toolholder and extends over the top of the insert to provide sufficient clamping force to hold the insert in the pocket.

Sometimes, however, external clamping mechanisms are not satisfactory because of the smallness in size of the insert or because of the amount of work space allowed for specific cuts.

When the external top clamps are not satisfactory, usually the cutting insert can be made with an axial hole through its center and placed over a rotatable pin element that is held by the toolholder. When using a pin, the insert is usually held firmly between the head of the pin and a side wall of the pocket of a toolholder.

Various mechanisms for providing the pin with enough force to hold the insert in the toolholder have been devised, a representative sampling of which may be had by reviewing U.S. Pat. No. 3,525,136 to Crosby; U.S. Pat. No. 3,787,941 to Novkov; U.S. Pat. No. 3,491,421 to Holloway; U.S. Pat. No. 3,488,422 to Jones; and U.S. Pat. Nos. 3,341,920 and 3,341,923 to Kelm. In addition, attention should be directed to U.S. Pat. Nos. 3,946,473; 3,623,201 and 3,310,859 for similar types of pin holding mechanisms.

While some of the above-mentioned clamping mechanisms have worked adequately, there is always a need to improve upon the efficiency and reliability of the clamping mechanism.

It is an object of the present invention to provide a stronger pin clamping mechanism.

It is a further object of the present invention to provide a more positive and faster acting pin clamping element.

BRIEF SUMMARY OF THE INVENTION

According to the present invention, a cutting tool is furnished for holding a cutting insert in an insert pocket during working operations. The cutting insert typically has an axial hole therethrough that is adapted for engagement with the head of a pin member.

The cutting tool is comprised of a cutter body having a portion adapted for attachment to a support member that may be either stationary or rotational in nature. On another part of the cutter body, an insert seat is provided having at least a bottom wall and side wall so that the cutting insert may rest on the bottom wall and be clamped between the head of the pin and the side wall of the insert seat.

A transverse pin receiving hole is formed through the bottom wall of the insert seat and is located so that it has at least partial registration with the central axial hole in the cutting insert.

The transverse pin receiving hole has an enlarged section immediately below the bottom wall of the insert seat such that an upward facing abutment shoulder is formed along the pin receiving hole. The pin, preferably, has another end opposite the insert engaging head that is adapted for moving engagement with the cutter body. Preferably, the end of the pin is threadedly connected in the cutter body such that rotational movement of the pin causes movement in a first and second direction, depending upon the direction of rotation of the pin.

Attached to the pin member, and intermediate of the ends of the pin, is an abutment shoe that may pivot upon the mid-section of the pin. When the abutment shoe, the pin, and the insert are all placed in the cutter body, rotation of the pin causes the pin to move in a first direction in the hole, abutting the shoe member against the upward face and the abutment shoulder.

As the pin is moved further in the first direction, the abutment shoe tilts the head of the pin toward the side wall of the insert seat and thus firmly and positively clamps the insert between the head of the pin and the side wall of the insert seat.

Rotation of the pin in an opposite direction causes the pin to move in a second direction which allows the abutment shoe some freedom of movement in the hole such that the resilient pin straightens and the insert is then not clamped against the side wall of the insert seat. Preferably, the pin has opposing ends with a reduced diameter portion between said ends adapted for engagement with the pivotal shoe member. The pin may also have a flanged portion intermediate of the ends for engaging a shim member placed beneath the insert in the insert seat.

The shoe member, preferably, is formed having a somewhat C-shaped cross section when viewed in plan such that the arms of the C-shaped shoe fit substantially around the diameter of the pin and is resiliently held on the pin by the arms.

The exact nature of the present invention will become more clearly apparent upon reference to the following detailed specification taken in connection with the accompanying drawings in which:

BRIEF DESCRIPTION OF THE DRAWINGS

FIG. 1 is a perspective view of a toolholder with an assembly view of the insert, pin and shoe member.

FIG. 2 is a cut-away side view of the clamping mechanism according to the present invention in a clamped position.

FIG. 3 is a cut-away side view of the clamping mechanism according to the present invention in an unclamped position.

FIG. 4 is a cross section in plan of the pivot shoe member and the pin.

FIG. 5 is a side view of the pivot shoe element according to the present invention.

DETAILED DESCRIPTION OF THE INVENTION

Referring to the drawings somewhat more in detail, what is shown in FIG. 1 is a toolholder 10 having an insert pocket 12 in which is seated insert 14. The toolholder 10, as shown in FIG. 1, is a stationary tool holder; however, 10 could represent a section of a milling cutter or other type of tool upon which indexable, replaceable inserts are supported.

As shown in FIG. 1, there is a pin member 16 having an end thereon 18 for engaging central hole 20 of insert 14. A transverse hole 22 is shown formed through the bottom of the insert pocket 12 and lower end 24 of the pin 16 is threaded so as to engage a threaded portion of hole 22. Hole 22 has an enlarged portion near its intersection with the insert pocket 12 into which fits pivotal shoe member 26. Pivotal shoe member 26 engages a reduced diameter portion intermediate the ends of pin 16 and rests in the enlarged section of hole 22.

In the particular assembly shown in all of the figures, a shim member 28 is shown fitting into the pocket 12 of the toolholder. Shim members may or may not be used when seating an insert in the pocket of a toolholder; however, when so used, they help to form a bottom wall upon which to seat insert 14.

Insert 14, typically, in most toolholders 10, will have an insert seat comprised of at least a bottom wall and a side wall. When shim 28 is used, the top of shim 28 will form the bottom wall of the insert seat. If a shim is not used, then the insert will rest upon the bottom wall of the insert pocket.

Referring now to FIG. 2, what is shown therein is the insert 14 seated upon the shim 28 and abutting side wall 31 of a toolholder 10. The head of the pin 18 is engaged with the central axial hole 20. The pivot shoe member 26 is engaged on an intermediate portion of the pin 16 and is located in an enlarged section 30 of the transverse hole 22 in the toolholder 10.

The lower end 24 of pin 16 is threadedly engaged with the hole 22 such that rotation in one direction of pin 16 causes the pin to move downwardly in hole 22 while rotational motion in an opposite direction will cause the pin member 16 to move upwardly in hole 22.

The enlarged section 30 that was formed in hole 22 has formed an upwardly facing abutment shoulder 32 which engages the lowermost portion of the pivot shoe 26. As shown in FIG. 2, the pin member 16 has been rotated such that the pin has advanced downwardly in hole 22 forcing the nose of the pivot shoe 26 to engage the upwardly facing shoulder 32 and vertical shoulder 33.

Continued downward movement of pin 16 causes the shoe member 26 to bend the resilient pin 16 toward the side wall 31 of the insert seat and has thus firmly clamped the cutting insert 14 between the head 18 of pin 16 and the side wall 31.

As shown in FIG. 3, again, cutting insert 14 on toolholder 10 and pin 16 have a head portion 18 and a shim 28 forming a part of the insert seat. The pivot shoe member 26 is still located in enlarged portion 30 of the hole 22; however, pin 16 has been rotated in one direction and has caused movement upwardly in the hole 22.

Upward movement of pin 16 has relieved the abutment forces between the upwardly facing shoulder 32 and pivot shoe 26 and the resilient pin 16 has straightened such that the head 18 is not in engagement with the boundary wall of axial hole 20 on the insert. In this condition, the insert 14 may be freely removed and replaced or merely indexed so as to achieve a better cutting edge.

Referring now to FIG. 4, the pivot shoe is preferably C-shaped in cross sectional plan view and engages a reduced diameter portion intermediate the ends of 18 and 24 of pin 16. The engagement of the shoe with the reduced diameter portion may be seen in FIGS. 1 through 3. It can be seen in these figures that the reduced diameter intermediate section of pin 16 is of a length and a diameter that allows itself to be loosely engageable in bore 11 of shoe 26, as shown in FIG. 4. As shown in FIGS. 2 and 3, pin 16 is loosely engaged in bore 11 of shoe 26 such that the bottom surface 25 of shoe 26 faces threaded end 24 of pin 16.

In FIG. 4, the pivot shoe member is shown having a C-shaped cross section in plan having arms 34 that extend around the periphery of the reduced diameter portion of pin member 16. By advantageously sizing the diameter between the arms 34, one may snap pivot member 26 on and off the reduced diameter portion 16. Both the pivot shoe member 26 and the pin member 16 are preferably made of a tough, resilient material.

Shown in FIG. 5 is the pivot shoe member 26 having a bore formed longitudinally through one side so as to fit around the reduced diameter of pin 16. Pivot shoe member 26 has the bore formed so that its central axis can be in alignment with the longitudinal axis of the pin member when the pin member is mounted in hole 22, but will not be in alignment with the longitudinal axis as the pivot shoe member is forced to pivot in the enlarged section 30 of hole 22.

As shown in FIGS. 4 and 5, shoe 26 has a top surface 27 having a slanted portion 29. A peripheral surface 23 connects the top surface 27 to the bottom surface 25. Bore 11 communicates between top surface 27 and bottom surface 25 and intersects peripheral surface 23 continuously from top to bottom so as to provide the shoe body 26 with the C-shaped configuration observed when it is viewed in plan. Bore 11 is obliquely aligned with planes defined by top slanted portion 29 and bottom surface 25. Shoe 25 further has a convex surface 17 forming the juncture of peripheral surface 23 and bottom surface 25 in a location on the shoe body 26 generally opposite towhere bore 11 intersects peripheral surface 23.

Modifications may be made within the scope of the appended claims.

What is claimed is:

1. A cutting tool for holding a cutting insert having an axial hole therein, which comprises: a cutter body; an insert seat on said cutter body having at least a bottom wall and a side wall, the insert seat having a transverse pin receiving hole located for at least partial registration with the axial hole in the insert; abutment means in said pin receiving hole beneath said insert seat; a pin having a head for engaging the axial hole of the insert and another end for moving engagement with said cutter body in said pin receiving hole; an abutment shoe pivotally mounted in relation to and between said abutment means and said pin so that when said pin is moved in a first direction in the hole said shoe pivots forcing the head of the pin to tilt toward said side wall and clamp the insert in said insert seat, said pivotal shoe allowing said pin to straighten when said pin is moved in a second direction in said hole.

2. A cutting tool according to claim 1 in which said hole has an enlarged section beneath said insert seat and said abutment means is formed at the juncture of said enlarged section and said hole.

3. A cutting tool according to claim 2 in which said abutment shoulder faces upwardly toward said insert seat.

4. A cutting tool according to claim 1 in which said pin has a reduced diameter portion between said ends, said other end of said pin is threadedly engaged with said cutter body and said shoe member is recessed so as to fit around the axial dimension of said pin, said pin being rotatable with respect to said shoe member in said cutter body.

5. A cutting tool according to claim 4 which further includes said pin having a flanged portion intermediate said ends for engaging a shim member that is placed beneath said insert in said insert seat.

6. A cutting tool according to claim 4 in which rotation of said threaded pin advances said pin in said first direction and counter-rotation of said pin causes movement in said second direction.

7. A cutting tool according to claim 6 in which said first direction is downwardly into said cutter body and said second direction is opposite to said first.

8. A shoe member for use in an insert clamping arrangement which comprises a body of tough resilient material having a top surface having a slanted portion, a bottom surface, a peripheral surface connecting said top surface to said bottom surface, a bore communicating between said top surface and said bottom surface and intersecting said peripheral surface continuously from top to bottom so as to provide said body with a C-shaped configuration when viewed in plan, said bore aligned obliquely with planes defined by said top slanted portion and said bottom surface, a convex surface forming the juncture of said peripheral surface and said bottom surface, and wherein said convex surface is generally located on said shoe body opposite to where said bore intersects said peripheral surface.

9. A pin and shoe arrangement for holding a cutting insert having an axial hole therein on a cutter body with an insert seat thereon, said pin and shoe arrangement comprising: said shoe having a body of tough resilient material having a top surface having a slanted portion, a bottom surface, a peripheral surface connecting said top surface to said bottom surface, a bore communicating between said top surface and said bottom surface and intersecting said peripheral surface continuously from top to bottom so as to provide said body with a C-shaped configuration when viewed in plan, said bore aligned obliquely to planes defined by said top slanted portion and said bottom surface, a convex surface forming the juncture of said peripheral surface and said bottom surface, and wherein said convex surface is generally located on said shoe body opposite to where said bore intersects said peripheral surface; said pin having a threaded end, a reduced diameter intermediate section connecting said threaded end to an increased diameter head end, and wherein said reduced diameter intermediate section is of a length and a diameter sized to be loosely engageable in said bore of said shoe; and said reduced diameter intermediate section of said pin loosely engaged in the bore of said shoe such that said bottom surface of said shoe faces said threaded end of said pin.

* * * * *